W. E. BAILEY.
CAMERA.
APPLICATION FILED APR. 22, 1918.
1,378,208.
Patented May 17, 1921.
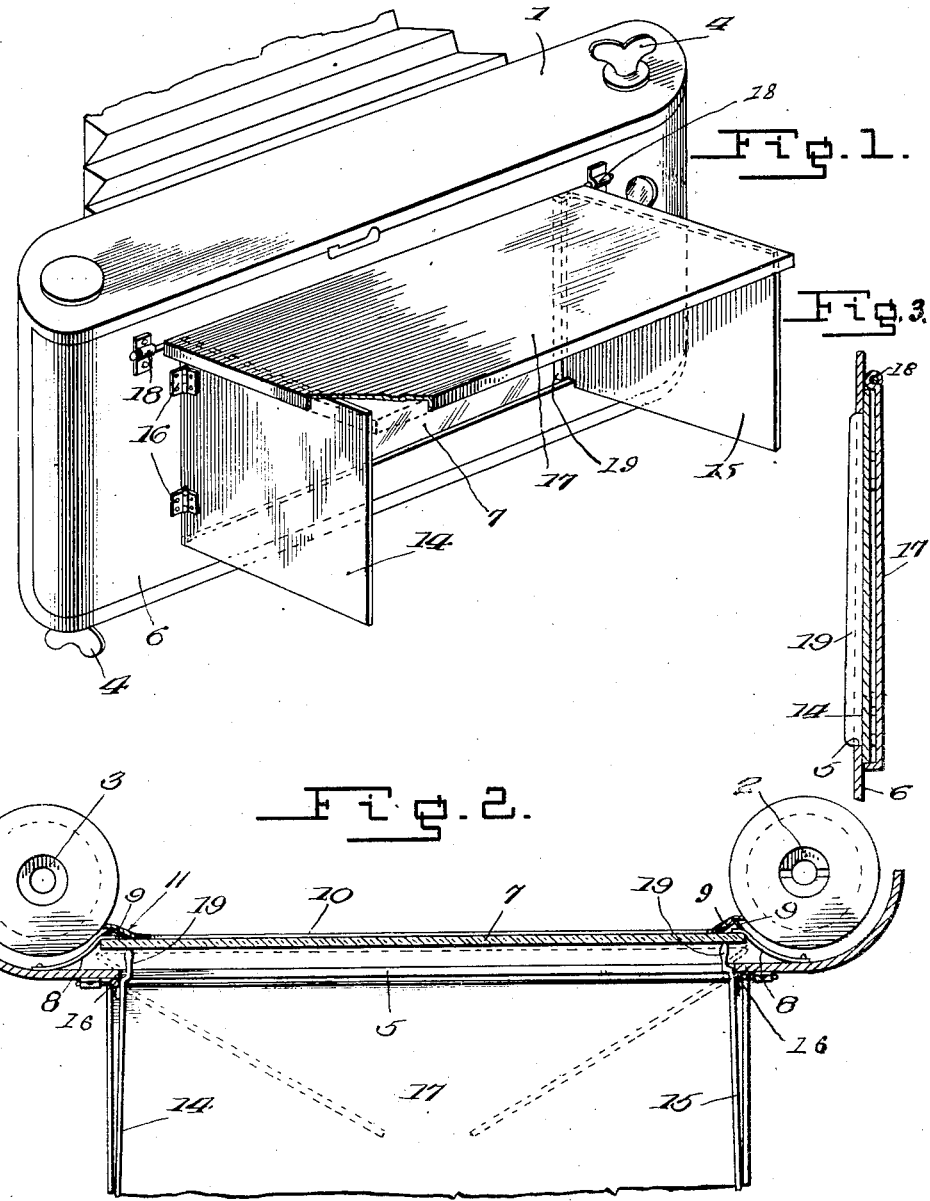
Inventor
W. E. Bailey.

UNITED STATES PATENT OFFICE.

WILLIAM E. BAILEY, OF ROCK ISLAND, ILLINOIS.

CAMERA.

1,378,208.            Specification of Letters Patent.      Patented May 17, 1921.

Application filed April 22, 1918. Serial No. 230,123.

*To all whom it may concern:*

Be it known that I, WILLIAM E. BAILEY, a citizen of the United States, and a resident of Rock Island, in the county of Rock Island and State of Illinois, have invented a certain new and useful Improvement in Cameras, of which the following is a specification.

This invention relates to cameras of the roll film type and the primary object of the invention is to provide a camera of this type which is constructed whereby a ground-glass may be employed for facilitating the accurate focusing of the camera.

More specifically, an object of this invention is to provide a camera of the roll film type having a removable back which back is provided with focusing opening, normally closed by a pair of hinged doors mounted to swing about axes transversely of the length of the camera and a third door or cover which is hinged to swing about an axis longitudinally of the camera and to fold over the first mentioned doors when the latter are in a folded position to form a light proof closure for the opening in the back of the camera to prevent the fogging of film when the latter is moved into alinement with the opening in the camera back.

A further object of this invention is to mount a ground glass within the camera body adjacent the inner surface of the back thereof which glass is normally held in engagement with the back to permit the free and unimpeded winding of the film from one of the rolls to the other, by suitable springs and which glass is forced, by projections along the edges of the pair of hinged doors inwardly away from the back of the camera into the position normally assumed by a film when a photograph is being taken thereon, to insure the proper focusing of the camera.

Other objects of the invention will appear in the following detailed description, taken in connection with the accompanying drawing forming a part of this specification, and in which drawing:

Figure 1 is a perspective view of a camera showing the doors open.

Fig. 2 is a horizontal section through the camera back showing the film rolls in position.

Fig. 3 is a section through the camera back showing the doors closed.

Referring more particularly to the drawing, 1 designates a camera of the roll film type having film carrying rolls 2 and 3 positioned therein and a winding key 4 for each roll, to permit the film to be wound in either direction past the opening 5 which is formed in the removable back 6 of the camera. The opening 5 is of substantially the same size as the cutting scope of the lens of the camera and a piece of ground-glass 7 is positioned within the body of the camera adjacent the inner surface of the back 6, the ends of the piece of glass projecting beyond the edges of the opening 5. Flat springs 8 are attached to the inner surface of the back 6 and engage the inner surface of the plate 7 for holding the plate in engagement with the inner surface of the back 6.

Guards 9 are mounted over the ends of the springs 8 which engage the plate 7 and these guards have their outer surfaces inclined as clearly shown in Fig. 2 to prevent the catching thereagainst of the edges of the openings 10 formed in the backing 11 of the film which is wound upon the spools 2 and 3. The openings 10 are preferably of the same size as the opening 5 and they are formed near the ends of the backing 11 beyond the ends of the film carried by the backing.

Doors 14 and 15 are hingedly connected as shown at 16 to the back 6 of the camera and they swing about axis transversely to the length of the camera. The upper and lower edges of the doors 14 and 15 overlap the edges of the opening 3 in the back 6 as clearly shown in Fig. 5 of the drawing and these overlapping edges, together with the hinged covers 17 form a light proof closure for the opening 5 to prevent the fogging of a film. The cover 14 is hingedly mounted as shown at 18 to swing about an axis longitudinally of the body of the camera. The edges of the cover 17 are bent at right angles to the main body thereof to fit snugly against the outer surface of the back 6 when the cover is in a closed position and when the cover is in a raised position and the doors 14 and 15 are open, the upper edges of these doors engage against the downturned end edges of the cover 17 for forming a shade for the opening 5, and thereby eliminating the necessity of the employment of an ordinary focusing hood or cover.

The edges 19 of the doors 14 and 15 are struck out from the doors and engage over the end of the opening 5, being positioned against the inner surface of the back 6 and in engagement with the outer surface of the plate 7 so that when the doors 14 and 15 are swung outwardly or into their open position the edges 19 engaging the plate 7 will force the latter inwardly away from the back 6 and into the position assumed by a film when a photograph is being taken thereon, thereby insuring the proper focusing of the camera.

In the use of the improved camera, when it is desired to properly focus the same, the film is wound upon either of the rolls 2 or 3 to bring one of the openings 10 in alinement with the opening 5 after which the cover 17 is moved outwardly and the doors 14 and 15 are opened, forming a hood for the focusing opening in the camera back. The outward opening movement of the doors 14 and 15 will force the ground-glass plate 7 inwardly, into the position normally assumed by a film and by proper adjustment of the lens, the sharpness of the image on the ground-glass may be regulated as desired and the camera properly focused. After the camera has been properly focused, the doors 14 and 15 and the cover 17 are closed which forms a practically light proof closure for the opening 5, and the film is then rewound to position the first unexposed film upon the roll in alinement with the lens.

Having thus fully described the invention, what is claimed is:

1. The combination with a camera having a back provided with a focusing opening, adapted to register with openings in a film backing, a ground-glass positioned within said camera and over said opening, flat springs carried by said camera back and engaging said ground-glass to normally hold the ground-glass in engagement with the camera back out of the path of said film, and guards carried by said ground-glass plate and extending over said springs to prevent engagement of the film backing with the springs.

2. In a camera having a back provided with a focusing opening, a pair of doors hinged to said back and forming closure for the opening, a cover hinged to said back to swing about an axis transverse to the axis of said doors and adapted to fold over the doors.

3. In a camera having a back provided with a focusing opening, a pair of doors hinged to said back and forming closures for the opening, a cover hinged to said back to swing about an axis transverse to the axis of said doors and adapted to fold over the doors, the edges of said cover being angled to overhang the edges of said doors, and the edges of said doors overlapping the edges of focusing opening to co-act with said cover and its angled edges to form light proof closures for the opening.

4. In a camera, a back provided with a focusing opening, a ground-glass plate positioned over said opening and normally engaging the inner surface of said back, a pair of doors hingedly connected to said back and forming closures for the opening, extensions formed upon the hinged edges of said doors and extending through the opening into the interior of the camera for engagement with said plate to displace the plate from the camera back upon opening movement of the said doors, a cover hinged to said back to swing about an axis transverse to the axis of said doors and adapted to fold over the doors.

5. In a camera, a back provided with a focusing opening, a ground-glass plate positioned over said opening and normally engaging the inner surface of said back, flat springs carried by said back and engaging said plate to yieldably hold it in engagement with the back, a pair of doors hingedly connected to said back and forming closures for the opening, the edges of the said doors overlapping the edges of said opening, a cover hinged to said back to swing about an axis transverse to the axis of said doors and adapted to fold over the doors for coaction with the doors to form a substantially light proof closure for the focusing opening, extensions formed upon the hinged edges of said doors and engaging said ground-glass plate to force the ground-glass plate away from the camera back upon opening movement of the doors.

6. In a camera, a back provided with a focusing opening adapted to register with openings in a film backing, a ground glass plate positioned over said back opening and normally engaging the inner surface of said back, resilient means carried by said back and engaging said plate to yieldingly hold the same in engagement with the back, a pair of doors hinged to said back and forming a closure for said opening, the edges of said doors overlapping the edges of said opening, a cover hinged to said back to swing about an axis transverse to the axis of said doors and adapted to co-act therewith to form a substantially light proof closure for the focusing opening, extensions carried by said doors engaging said ground glass plate and adapted to force the same away from the camera back upon opening movement of said doors, and guards associated with said resilient means to prevent the engagement of the film backing therewith.

WILLIAM E. BAILEY.